United States Patent
Meyer et al.

(10) Patent No.: US 7,209,036 B2
(45) Date of Patent: Apr. 24, 2007

(54) DEVICE AND PROCESS FOR GUIDING A PERSON ALONG A PATH TRAVELED

(75) Inventors: Jörg-Uwe Meyer, Ratzeburg (DE); Frank Sattler, Lübeck (DE); Henning Gerder, Lübeck (DE); Udo Beckmann, Stockelsdorf (DE); Hartmut Stark, Stockelsdorf (DE); Hans Matthiessen, Bad Schwartau (DE)

(73) Assignee: Dräger Safety AG & Co. KGaA (DE)

( * ) Notice: Subject to any disclaimer, the term of this patent is extended or adjusted under 35 U.S.C. 154(b) by 196 days.

(21) Appl. No.: 11/101,308

(22) Filed: Apr. 7, 2005

(65) Prior Publication Data

US 2006/0009167 A1 Jan. 12, 2006

(30) Foreign Application Priority Data

Jul. 7, 2004 (DE) .................. 10 2004 032 813

(51) Int. Cl.
*G08B 1/08* (2006.01)
(52) U.S. Cl. ................... 340/539.13; 340/539.11; 340/825.49; 455/404.2; 702/2; 702/5
(58) Field of Classification Search ........... 340/539.13, 340/539.2, 539.14, 539.11, 539.1, 825.49, 340/825.69, 825.72; 455/96, 404.2; 702/2, 702/5
See application file for complete search history.

(56) References Cited

U.S. PATENT DOCUMENTS

| 6,424,264 | B1 | 7/2002 | Giraldin et al. | |
| 7,054,747 | B2 * | 5/2006 | Ruelke et al. ............ | 702/2 |
| 7,091,852 | B2 * | 8/2006 | Mason et al. ........... | 340/539.13 |
| 2002/0091482 | A1 * | 7/2002 | Eakle et al. ............ | 701/207 |
| 2003/0014186 | A1 | 1/2003 | Adams, Jr. et al. | |
| 2004/0070515 | A1 * | 4/2004 | Burkley et al. ........ | 340/825.49 |

FOREIGN PATENT DOCUMENTS

| DE | WO 03/002942 A1 | 1/2003 |
| DE | 101 41 388 A1 | 2/2003 |
| DE | 102 56 806 C1 | 9/2003 |

OTHER PUBLICATIONS

Jack Mottley, Nov. 11, 2003, Stand der Technik: Veröffentlichtes Material, Sensor Technology.

* cited by examiner

*Primary Examiner*—Brent A. Swarthout
(74) *Attorney, Agent, or Firm*—McGlew & Tuttle, PC

(57) ABSTRACT

A device for guiding a person along a traveled path enables the wearer of the device to be guided back along the traveled path in an electronically supported manner even under conditions under which orientation is difficult. The device has a portable ejection means (2), in which a container (14) for accommodating a plurality of transponders (7) and an ejection mechanism (10), which is actuated by a control device (6) to eject a transponder (7) from the container (14), are present. A control unit (6) is prepared such as to actuate the ejection mechanism (10) at predetermined time intervals or at predetermined distances in space. A portable transmitter/receiver device (8) is designed to detect at least one of the transponders (7) dropped off and to generate a signal representative of the direction in which that transponder (7) is located. A portable display device (4) receives the direction signal of the transmitter/receiver means (8) and offers the wearer a visual and/or acoustic display of the direction.

20 Claims, 2 Drawing Sheets

DEVICE AND PROCESS FOR GUIDING A PERSON ALONG A PATH TRAVELED

CROSS REFERENCE TO RELATED APPLICATIONS

This application claims the benefit of priority under 35 U.S.C. § 119 of DE 10 2004 032 813.7 filed Jul. 7, 2004, the entire contents of which are incorporated herein by reference.

FIELD OF THE INVENTION

The present invention pertains to a device and a process for guiding a person along a path traveled.

BACKGROUND OF THE INVENTION

Applications herefor are found, for example, in cases in which persons must move forward in environments that are difficult to see into or make orientation difficult in another way, for example, to find the way back. Such an application may concern, for example, a fireman, who must move through an unknown area and/or an environment in which visibility is greatly restricted and must find the way back later. It may also be necessary in an emergency for another fireman to retrace the path traveled in order to rescue the first one.

SUMMARY OF THE INVENTION

The object of the present invention is to propose a device and a process that make it possible for a person to trace back a traveled path in an electronically supported manner.

A device to accomplish this object advantageously comprises a portable ejection means, in which a container for accommodating a plurality of said transponders and an ejection mechanism connected with the said container are present. The ejection mechanism is actuated by a control unit in order to eject a transponder from the container, wherein the container is prepared to actuate the ejection mechanism at predetermined time intervals or at predetermined distances in space. A portable transmitter/receiver means is provided that is designed to detect at least one dropped-off transponder and to generate a signal representative of the direction in which the transponder is located. A portable display means is provided which is designed to receive the direction signal of the transmitter/receiver means and to offer the wearer a visual and/or acoustic display of the direction.

According to the present invention, the portable evaluating ejection means and the portable transmitter-receiver means as well as the portable display means belong to the device. The ejection means contains a container for accommodating a plurality of transponders and an ejection mechanism, which is connected with the container and is actuated by a control unit. The control unit is prepared such that the ejection means is triggered at predetermined times or at certain distances in space to eject a transponder, so that the latter will stay on the path. The portable transmitter/receiver means is designed to detect at least one transponder, preferably the transporter located closest, and to generate a signal representative of the direction in which that transponder is located. This signal is then passed on to the display means, which offers the wearer a visual and/or acoustic display for that direction. Consequently, an electronically detectable trail, which can be traced back by the wearer or can also be retraced by another person, who is equipped with a transmitter/receiver means, is generated according to the present invention by the dropping off of the transponders.

A transponder is, in principle, a miniaturized transmitter/receiver means for radio frequency signals, which operates according to the scanning-response system. A scanning signal received by the transponder is received and (in case of active transponders) evaluated. A coded response signal with defined desired information is thereupon sent in case of active transponders. There is no independent power supply for transmitting signals in case of so-called passive transponders. These passive transponders are detectable when they come into the vicinity of a transmitter/receiver means, which excites the passive transponder by a radio frequency signal, as a result of which the transmitter/receiver means, which is occasionally also called a reader, can detect the transponder. Passive transponders can be made, of course, as smaller and lighter units.

Transponders have already been used in many applications for tracking objects to which they are fastened, e.g., pieces of luggage in airports, merchandise in supermarkets, parcel shipments, etc. The transponders are arranged in these cases on the objects to be traced and are scanned by a usually stationary reader. Such passive transponders are also called RF-ID (Radio Frequency Identification) tags.

More recent applications describe navigation systems for the blind, in which case transponders are arranged in certain positions in the room, and a mobile transmitter-receiver is present, which can be worn by the person. In case of suitable preparation of the transmitter-receiver, a computing unit provided therein can determine a position information relative to the transponders from the detected signals of the transponders, and this position information can be converted into position information in the rooms if the positions of the transponders are known and it can be passed on to the wearer, e.g., acoustically (*Sensor Technology*; Vol. 19, Nov. 11, 2003). One drawback of this approach is that each room must first be equipped with transponders at defined locations in order to make navigation in the rooms possible.

The present invention pursues a fundamentally different approach by marking the path traveled by transponders deposited at certain distances.

In a preferred embodiment, an identification code specific to the device is stored in each transponder before it is dropped, which can be brought about by means of a processor unit arranged upstream of the ejection mechanism. The wearer of the device is indirectly identified by this specific identification code. The marked paths of a plurality of persons can thus be prevented, for example, from leading to ambiguous results in case they intersect. Each transmitter/receiver means is now preferably prepared such that it will take into account only the transponders that are sending back the correct, specific identification code.

Furthermore, it is advantageous to store in each transponder, before it is dropped, a sequence code specific to the position of that transponder in the dropping sequence or to link a code, which specifies the transponder and can be read from the transponder, with an ordinal number specifying the position of that transponder in the dropping sequence in order to store these in a linked manner. By preparing the control unit or another processor unit in the transmitter/receiver means in a suitable manner, it is thus possible to specifically search for the transponder that can be expected to be the nearest based on the dropping sequence. Furthermore, it will also be possible to trace back the path if the path traveled contains a loop and thus intersects itself.

In another preferred embodiment, the device has, furthermore, a navigation system (GPS) for satellite-supported absolute positioning, which is connected with the control device of the ejection means. Additional information can thus be stored in the transponders before they are dropped, for example, information on the position information from the navigation system and the point in time at which the transponder was dropped, so that the path and the events occurring during the travel over this path can be followed up completely later. As an alternative, the current position information supplied by the navigation system can be stored in such a way that it is linked with a code that can be read from the transponder and specifies the transponder, so that the transponder and the position at which it was dropped are also available in a linked manner. This linked information can then be used to determine the distance from the nearest transponder.

According to the process for guiding a person along a traveled path, provisions are made according to the present invention for a transponder to be automatically ejected along the person's path at predetermine time intervals or at predetermined distances in space in order to distribute the transponders along the traveled path, and for guiding along the traveled path, a portable transmitter/receiver means detects at least one of the dropped transponders and generates a signal, which is representative of the direction in which that transponder is located and is displayed on a display means as a visual and/or acoustic signal in order to show the way to the detected transponder.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The present invention will be described below on the basis of an exemplary embodiment shown in the drawings, in which.

DESCRIPTION OF THE PREFERRED EMBODIMENTS

Figure 1:
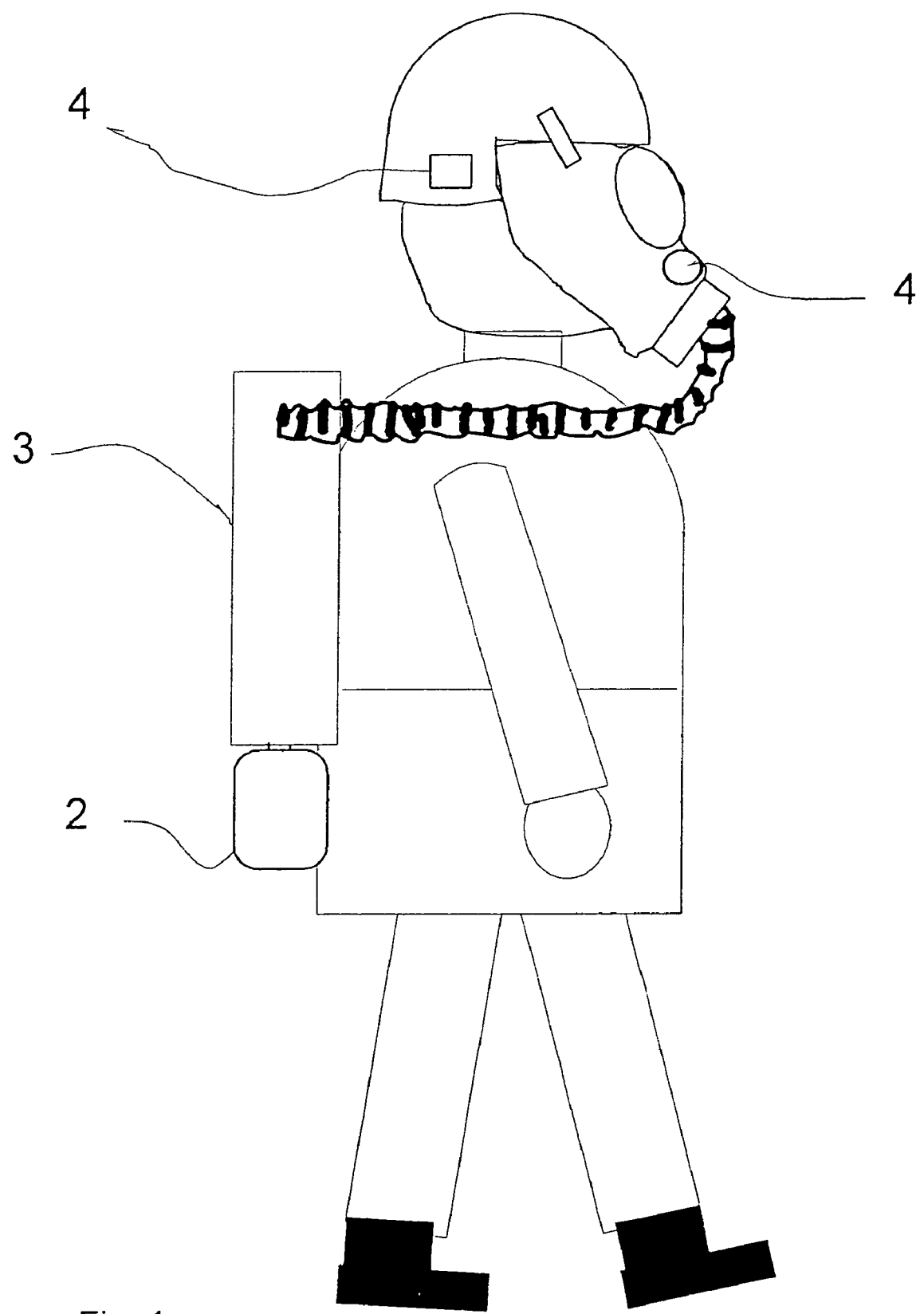
FIG. 1 is a schematic view of a person with an embodiment of the device according to the invention.

Referring to the drawings in particular, the embodiment of the device shown in FIG. 1 is combined with a respirator (R) 3. The ejection means 2 for transponders is arranged at the bottom on a breathing air supply (as a support), especially on an oxygen cylinder or compressed air cylinder for breathing air supply. The transmitter-receiver unit and the control unit may also be integrated in one device unit in this ejection means 2. The ejection means 2 is connected, furthermore, with the helmet and/or the breathing mask of the wearer for signal transmission in order to control a display means 4 integrated in the breathing mask and/or the helmet.

Figure 2:
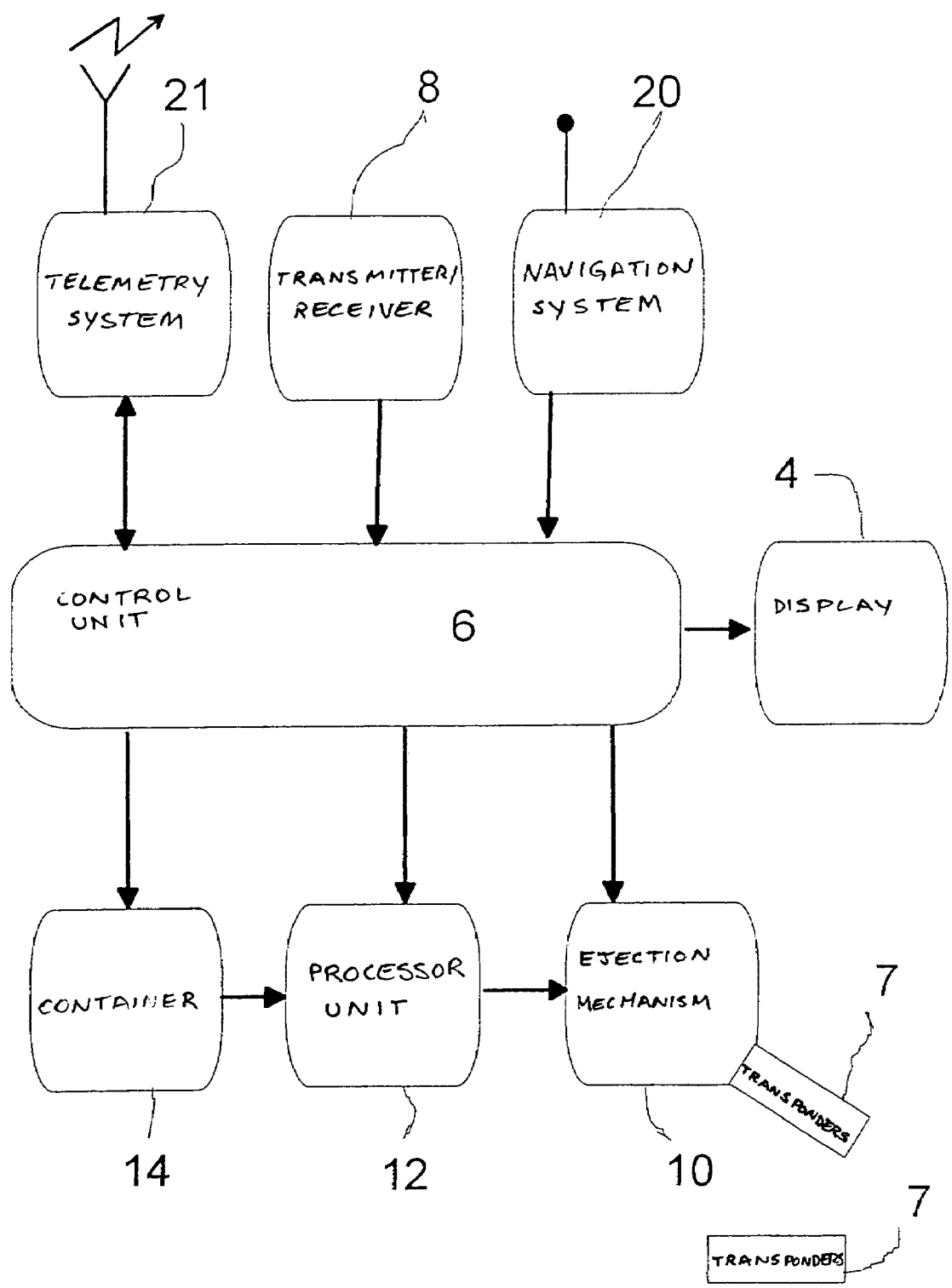
FIG. 2 is a schematic block diagram to illustrate the control of the device of FIG. 1.

FIG. 2 shows a schematic block diagram of the essential components of the device. A container 14, to which a processor unit 12, which is prepared for programming the transponders 7 delivered from the container 14 to the processor unit 12, is shown there as a storage means for a plurality of transponders 7. Each transponder 7 is delivered from the processor unit 12 to an ejection mechanism 10. This process is controlled by a control unit 6, which is connected with the respective corresponding components for passing on a transponder 7 from the container 14, for the type of programming of the transponder 7 by the processor unit 12, for the further transportation of the transponder 7 from the processor unit 12 to the ejection mechanism 10 and for actuating the ejection mechanism 10 for ejecting the transponder 7.

The ejection mechanism 10 may be designed, e.g., in the form of a revolver magazine.

The control unit 6 is prepared by programming such that the process of releasing a transponder 7 from the container 14, the programming of the transponder in the processor unit 12, and the passing on and, finally, the ejection from the ejection mechanism 10 take place automatically according to preset criteria. This process of ejecting another transponder 7 may take place, for example, at constant time intervals, at constant distances in space when the control unit is connected with a standard navigation system (GPS), or, for example, after a certain number of steps taken by the wearer. The control unit must also be equipped with a pedometer in the latter case.

Furthermore, a transmitter/receiver means 8, which is designed to detect transponders, is connected with the control unit 6. In case of active transponders, this may be a transmitter/receiver means that sends a start signal, which triggers a repeat-back signal sent by the transponder when it is received by the given transponder, and the repeat-back signal is then received by the transmitter/receiver means 8. In case of passive transponders, the transponder absorbs energy from the radio frequency radiation of the transmitter/receiver means 8, which is likewise detectable in this. The transmitter/receiver means 8 is preferably prepared such that it detects the transponder located nearest. The transmitter/receiver means 8 is designed, furthermore, such that when the transponder is detected, it generates a signal that is representative of the direction in which that transponder is located, and this signal is sent to the control unit 6. The control unit 6 generates from this a control signal for a display means 4, which offers the wearer of the device a visual and/or acoustic display for the direction in which the transponder is located. This display means (or portable display means) 4 may be integrated, for example, in a safety helmet or a breathing mask.

The control unit 6 may, furthermore, be prepared for controlling the processor unit 12 such that certain data are stored in the particular transponder 7 before it is dropped off. This may be, e.g., a code that is specific to the control unit 6 and identifies the device and thus indirectly also permits the wearer to be identified. As a result, the electronic trail of a certain wearer can be retraced or the wearer can trace back his own trail, even if this trail crosses the paths of wearers of other devices of the same design, because the control unit 6 can recognize its own identification code and can respond as a result selectively to the transponders 7 dropped off by the device proper.

Furthermore, a code specific to the position of the transponder 7 in the dropping sequence may be stored in each transponder 7, e.g., in the form of a simple consecutive numbering. In case of suitable preparation of the control unit 6, this may be used when tracing back the trail to identify the nearest transponder 7 to be expected. As an alternative, a code, which can be read from the transponder 7 and specifies the transponder 7, may be linked during the dropping with an ordinal number representing the position of that transponder in the dropping sequence, and this linked information can be stored in the control unit 6. When the code specifying the transponder 7 is detected, the position of that transponder 7 in the dropping sequence can also be inferred in the control unit 6, and the identification code of the nearest transponder 7 to be expected can already be determined.

Furthermore, an absolute position information may be stored in each transponder 7 before it is dropped off if the device is also equipped with a navigation system 20, such as a GPS navigation system. The storage of the absolute space coordinates of the drop-off site can then also be used to determine distances from nearest transponders 7 and to determine the path already traveled and the path yet to be traveled to the starting point at the time of the subsequent retracing of the trail. Again, this specific information (position information) does not have to be stored in the transponder 7 itself, but it may also be stored in another way in the device, e.g., in the control unit 6, so long as a linkage of the particular information with a code that specifies the particular transponder 7 and can be read from the transponder 7 is stored there.

The present invention makes it possible for a wearer to trace back the path traveled in a simple, electronically supported manner, even if the prevailing conditions are such that visibility is greatly impaired or orientation is difficult for other reasons.

Furthermore, a next wearer of another device can also trace back the trail marked by the sequence of transponders 7 in an electronically supported manner, for example, if the wearer of the first device is in danger and needs help. The device is optionally equipped with a telemetry system 21 for communication with a mission center or with devices of the same type of other wearers. A bidirectional communication system is preferably used to receive and pass on speech and data, i.e., person-related personal data, for example, physiological status data, position data and status data of the respirator, such as alarm data or the pressure in the cylinder.

While a specific embodiment of the invention has been shown and described in detail to illustrate the application of the principles of the invention, it will be understood that the invention may be embodied otherwise without departing from such principles.

What is claimed is:

1. A device for guiding a person along a path traveled, the device comprising:
    a plurality of transponders;
    an ejection mechanism;
    a portable ejection means with said ejection mechanism and a container for accommodating said plurality of transponders, said ejection mechanism being connected with the container;
    a control unit, said ejection mechanism being actuated by said control unit in order to eject a transponder from said container, wherein the container ejects transponders by said ejection mechanism at predetermined time intervals or at predetermined distances in space;
    a portable transmitter/receiver means for detecting at least one dropped-off transponder and for generating a signal representative of the direction in which the transponder is located; and
    a portable display means for receiving the direction signal of the transmitter/receiver means and providing a user one of a visual or acoustic display of the direction.

2. A device in accordance with claim 1, wherein the transmitter/receiver means detects at least the nearest transponder and generates a signal representative of the direction in which the transponder is located.

3. A device in accordance with claim 1, further comprising: a navigation system for satellite-supported determination of an absolute position, said navigation system being connected with said control unit.

4. A device in accordance with claim 1, further comprising a processor unit for storing an identification code specific to the device in each transponder before it is dropped off, said processor being arranged upstream of the ejection mechanism.

5. A device in accordance with claim 1, further comprising a processor unit for storing a sequence code specific to the position of a particular transponder or storing a link to a code that specifies the transponder and can be read from the transponder with an ordinal number specifying the position in the dropping sequence in each said transponder and to store these in the processor unit or in the control unit, said processor unit being arranged upstream of the ejection mechanism.

6. A device in accordance with claim 1, further comprising a processor unit for storing current position information supplied by the navigation system in a transponder before the transponder is dropped off or linking the current position information with an identification code for the transponder and storing the link of the current position information with the identification code in the processor unit or in the control unit, said processor unit being arranged upstream of the ejection mechanism.

7. A device in accordance with claim 1, wherein the control unit includes means to actuate the ejection mechanism at predetermined, constant intervals in time.

8. A device in accordance with claim 1, wherein the control unit includes means to receive and process the detection signals of the transmitter/receiver means and to actuate the ejection mechanism as soon as the processing of the detection signal of the transponder dropped off last shows that this transponder is located at a predetermined distance or the amplitude of the detection signal is below a preset value.

9. A device in accordance with claim 6, wherein a distance from the next transponder is determined from the drop-off position that can be read from the transponder or is stored in the processor unit or in the control unit and the current position given by the navigation system and is displayed in the display means.

10. A process for guiding a person along a path traveled, the process comprising the steps of:
    automatically ejecting transponders at predetermined time intervals or at predetermined distances in space as determined by a controller along the path of the person in order to distribute the transponders along the path traveled; and
    detecting at least one of the transponders dropped off with a portable transmitter/receiver means and generating a signal that is representative of the direction in which the transponder is located and displaying the signal generated or information associated with the signal generated on a display means as one of a visual or acoustic signal in order to show the way to the detected transponder for guiding along the path traveled.

11. A process in accordance with claim 10, wherein at least the transponder located nearest to the transmitter/receiver means is detected.

12. A process in accordance with claim 10, wherein the transponders used are passive transponders.

13. A process in accordance with claim 10, further comprising storing a code, which can be unambiguously assigned to the transmitter/receiver means, in each transponder before it is dropped off.

14. A process in accordance with claim 10, further comprising storing a code specifying the position of the particular transponder in the dropping sequence, in each transponder before it is dropped off, or assigning a code, which specifies the transponder that is about to be dropped off and can be read from the transponder, and assigning a code specifying the position of that transponder in the dropping sequence and storing both assigned codes in a linked manner outside the transponder.

15. A process in accordance with claim 10, wherein current position information supplied by a navigation system is stored in each said transponder before it is dropped off, or current position information is linked with an identification code specific to the particular transponder, and this linked information is stored outside the transponder.

16. A process in accordance with claim 10, wherein said transponders are automatically ejected at constant time intervals.

17. A process in accordance with claim 10, further comprising automatically determining the number of steps taken by the person and automatically ejecting a transponder after a predetermined number of steps.

18. A process in accordance with claim 10, wherein the transmitter/receiver means detects the transponder dropped off last and automatically ejects another transponder when the detected signal of the preceding transponder meets a predetermined criterion.

19. A process in accordance with claim 18, wherein another transponder is automatically ejected when the processing of the detection signal of the transponder dropped off previously leads to the result that a predetermined maximum or desired distance in space is reached from the transponder dropped off previously.

20. A device for guiding a person along a path traveled, the device comprising:

a support carried or worn by a user;

an ejection mechanism carried by said support;

a container accommodating a plurality of transponders, said ejection mechanism being connected with the container;

a control unit, said ejection mechanism being actuated by said control unit in order to eject transponders from said container at predetermined time intervals or at predetermined distances in space;

a transmitter/receiver means for detecting at least one dropped-off transponder and for generating a signal representative of the direction in which the transponder is located; and a display means for receiving the direction signal of the transmitter/receiver means and providing a user one of a visual or acoustic display of the direction.

\* \* \* \* \*